United States Patent
Nakayama

(10) Patent No.: US 6,197,124 B1
(45) Date of Patent: Mar. 6, 2001

(54) PROCESS FOR REMOVING MULTIPLE COATING FILM OR ADHERING SUBSTANCE FROM SUBSTRATE

(75) Inventor: Yasuharu Nakayama, Kanagawa-ken (JP)

(73) Assignee: Kansai Paint Co., Ltd., Hyogo-ken (JP)

( * ) Notice: Subject to any disclaimer, the term of this patent is extended or adjusted under 35 U.S.C. 154(b) by 0 days.

(21) Appl. No.: 09/152,127

(22) Filed: Sep. 12, 1998

(30) Foreign Application Priority Data

Sep. 12, 1997 (JP) .................................. 9-287535
Sep. 12, 1997 (JP) .................................. 9-287536

(51) Int. Cl.⁷ .................................. C23G 1/02; B08B 7/00
(52) U.S. Cl. .................................. 134/38; 134/3
(58) Field of Search .................................. 134/38, 3

(56) References Cited

U.S. PATENT DOCUMENTS 4,210,565 * 7/1980 Emmons .............................. 260/29.6

FOREIGN PATENT DOCUMENTS

708141 * 4/1965 (CA) ..................................... 134/38

* cited by examiner

*Primary Examiner*—Randy Gulakowski
*Assistant Examiner*—Yolanda E. Wilkins
(74) *Attorney, Agent, or Firm*—Huntley & Associates

(57) ABSTRACT

A process for removing a multiple coating film or an adhering substance and a layer of a cured adhesive agent which comprises a step of contacting a coated article (A) containing a multiple coating film having a lower coating layer formed on a substrate and an upper coating layer formed on the lower coating layer or an adhering substance (B) being allowed to adhere to a substrate by a layer of a cured adhesive agent with a mixture (C) comprising an acidic compound (a) and water as an essential component, the lower coating layer containing a cured binder resin having a chemical structure shown by the following chemical formula (1)

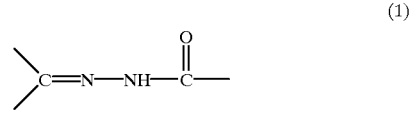

(1)

and the layer of the cured adhesive agent containing a cured binder resin having a chemical structure shown by the above-mentioned chemical formula (1).

15 Claims, No Drawings

PROCESS FOR REMOVING MULTIPLE COATING FILM OR ADHERING SUBSTANCE FROM SUBSTRATE

BACKGROUND OF THE INVENTION

The present invention relates to a process for removing a multiple coating film, or an adhering substance and a layer of a cured adhesive agent, and a process for forming a multiple coating film.

Presently, recycling of resources is an important problem. In order to recycle resources efficiently, and to reuse the substrate (or base material) of a coated material, removal of the coating from the substrate is necessary. Also, in order to reuse a substrate to which a layer such as cloth or paper is adhered with an adhesive, removal of the adhering layer and the cured adhesive itself is necessary.

Several well-known processes have previously been used for removing a coating layer from a substrate. These include mechanical removal by impact, combustion, dissolving with organic solvent and scraping away a coating film swelled with a solvent. None of these has been entirely satisfactory. Mechanical removal by impact and combustion are often difficult to use with plastic substrates. Processes involving dissolution by an organic solvent and scraping away a coating film swelled with a solvent are limited in their applicability because of dissolution of the substrate with the solvent. It is especially difficult to remove a coating film containing a resin which has a high molecular weight and has a low crosslinking degree as a binder, since the coating film is apt to cling to the substrate. In the case of a coating film having a high degree of crosslinking, it is not always easy to remove the coating from the substrate.

A dried layer of an adhesive agent obtained from an emulsion of non-crosslinkable adhesive agent typically has poor water resistance. As a result, such adhesive agents exhibit poor adhesion when wetted with water. In addition, a cured layer of an adhesive agent obtained from a crosslinkable adhesive agent has good performance in both water resistance and adhesion, but otherwise it is difficult to remove an adhering substance such as cloth and paper and the cured layer of adhesive agent itself.

SUMMARY OF THE INVENTION

The present invention provides a process for easily removing multiple layers from a substrate, including the cured adhesive used to adhere the layers to the substrate. The present invention permits the removal of the coating layers easily, regardless of the specific coating method originally used, and is applicable to coated substrates which include a cured adhesive which would normally be difficult to remove, including those adhesive agents having good water resistance and good adhesive properties. The process permits removing the layer of the cured adhesive agent and the coating layer or layers simultaneously.

The present invention also permits recycling of the substrates with retention of their original coating properties.

Still other features and advantages of the present invention will be apparent from the following description.

Specifically, the present invention provides a process for removing multiple layers from a substrate, wherein the multiple layers comprise at least one cured binder layer adjacent the substrate, the binder comprising at least about 25% by weight of a cured binder resin having a chemical structure shown by the following chemical formula (1)

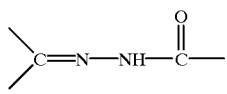

(1)

the coating further comprising at least one upper layer bonded to the binder layer, the process comprising contacting the multiple layers with a mixture comprising at least one acidic compound and at least about 0.001% water.

The present invention further provides a process for forming a multiple coating layer comprising:

(1) forming a lower coating layer on a substrate and
(2) forming an upper coating layer on the lower coating layer, the lower coating layer containing a cured binder resin having a chemical structure shown by the above-mentioned chemical formula (1).

DETAILED DESCRIPTION OF THE INVENTION

The present invention is based on the discovery that cured binder resin having a chemical structure as shown by formula (1) above is decomposed and changed to low molecular components and removed rapidly when contacted with a mixture comprising an acidic compound and water. Based on this discovery, an original upper coating layer formed on a lower coating layer containing the cured binder resin, and an adhering substance being allowed to adhere to a substrate by the layer of the cured adhesive agent can be removed, because the layer for attaching the original upper coating layer or the adhering substance is decomposed and disappears.

The process of the present invention for removing cured binder resin is applicable to substrates having at least one cured binder layer adjacent the substrate, the bind layer comprising at least about 25% by weight of a cured binder resin of chemical formula (1) as indicated above. Accordingly, the binder layer can consist essentially of binder resin or comprise a blend of binder resin with up to 75% by weight of other polymers, depending on the performance characteristics desired in the final multiple-layered construction. Thus, the binder layer can bind another coating to the substrate or an upper layer which is preformed, such as cloth, paper, leather and performed plastic films.

Regardless of the particular construction of the structure treated according to the present invention, the multiple layers are removed by contacting the structure with a mixture of at least one acidic compound and at least about 0.01% water (hereinafter "Mixture C"). This mixture dissolves the cured binder resin of Chemical formula (1), resulting in removal of the upper coatings or layers from the substrate as well as the cured binder.

The specific cured binder resin adjacent to the substrate can vary widely, so long as the cured binder resin has the chemical structure shown by the afore-mentioned chemical formula (1).

Specific examples of the cured binder resin having a chemical structure shown by the afore-mentioned chemical formula (1) include a cured binder resin obtained by a curing reaction of a carbonyl group-containing compound with a compound having two or more groups in all, selected from the hydrazido group shown by the following formula (2), the hydrazido group bonding to a carbon atom directly

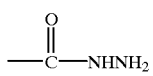

and the semicarbazido group shown by the following formula (3), and so on.

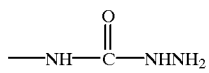

A wide variety of compositions are reported in the literature which can form the cured binder resin having the chemical structure shown by the aforementioned chemical formula (1) including, for example, The Chemistry of Amides PART TWO (INTERSCIENCE PUBLISHERS), 1970, Chapter 10, 515–600; Japanese Patent Application Kohkai No. 08/206585 (1996); and Japanese Patent Application Kohkai No. 09/057183 (1997).

In the process of the present invention, specific examples of the above-mentioned carbonyl group-containing compound which can be used include carbonyl group-containing resins such as carbonyl group-containing acrylic resins, carbonyl group-containing epoxy resins, carbonyl group-containing alkyd resins, carbonyl group-containing polyester resins, carbonyl group-containing urethane resins and the like; carbonyl group-containing compound having a low molecular weight such as glyoxal, diacetyl, butanedione, 2,4-pentanedione, 2,4-hexanedione, heptanedione, octanedione, diacetylbenzene and the like. Among these, carbonyl group-containing acrylic resins are preferred.

The carbonyl group-containing acrylic resins which can be used include copolymers of a vinyl monomer containing a carbonyl group and the other vinyl monomer.

Representative examples of the vinyl monomer containing a carbonyl group mentioned above include acrolein, diacetone acrylamide, diacetone methacrylamide, formyl styrol, vinyl alkyl ketones which have 4 to 7 carbon atoms (such as vinyl methyl ketone, vinyl ethyl ketone and vinyl butyl ketone), acetoacetoxyethyl acrylate, acetoacetoxyethyl methacrylate, an addition compound of a polymerizable unsaturated monomer having isocyanato group (such as m-isopropenyl-α,α(-dimethylbenzyl isocyanate, isocyanatoethyl methacrylate and methacryloylacyl isocyanate and the like) and 4-hydroxy-2-butanone. Among these, diacetone acrylamide is preferred.

A wide variety of other vinyl monomers can be used to form a copolymer with the vinyl monomer containing a carbonyl group mentioned above, as long as the monomer is copolymerizable with the vinyl monomer. Representative examples of the other vinyl monomer include alkyl (C 1 to 30) esters or cycloalkyl (C I to 30) esters of acrylic acid or methacrylic acid, such as methyl acrylate, ethyl acrylate, n-propyl acrylate, isopropyl acrylate, (n-, i-, t-) butyl acrylate, hexyl acrylate, 2-ethylhexyl acrylate, n-octyl acrylate, decyl acrylate, lauryl acrylate, stearyl acrylate, cyclohexyl acrylate, methyl methacrylate, ethyl methacrylate, n-propyl methacrylate, isopropyl methacrylate, (n-, i-, t-) butyl methacrylate, hexyl methacrylate, 2-ethylhexyl methacrylate, n-octyl methacrylate, decyl methacrylate, lauryl methacrylate, stearyl methacrylate, cyclohexyl methacrylate; alkoxyalkyl (C 2 to 18) esters of acrylic acid or methacrylic acid, such as trimethoxybutyl acrylate, trimethoxybutyl methacrylate, methoxyethyl acrylate, methoxyethyl methacrylate, ethoxybutyl acrylate, ethoxybutyl methacrylate; hydroxyalkyl (C 2 to 8) esters of acrylic acid or methacrylic acid, such as 2-hydroxyethyl acrylate, hydroxypropyl acrylate, hydroxybutyl acrylate, 2-hydroxyethyl methacrylate, hydroxypropyl methacrylate, hydroxybutyl methacrylate; carboxyl group-containing monomers such as acrylic acid, methacrylic acid, maleic anhydride and itaconic acid; amino group-containing monomers such as N,N-dialkylaminoalkyl (meth)acrylates (the alkyl of each alkyl group may preferably have 1 to 4 carbon atoms) such as N,N-dimethylaminoethyl acrylate, N,N-dimethylaminoethyl methacrylate, N,N-diethylaminoethyl acrylate, N,N-diethylaminoethyl methacrylate, N,N-dimethylaminopropyl acrylate, N,N-dimethylaminopropyl methacrylate, N,N-diethylaminopropyl acrylate and N,N-diethylaminopropyl methacrylate; styrene, vinyltoluene, acrylamide, methacrylamide, acrylonitrile, methacrylonitrile, vinyl chloride, and the like.

The above-mentioned copolymer comprises a monomer which contains an acryloyl group or methacryloyl group as at least a part of monomer components constituting the copolymer. The amount of the vinyl monomer containing a carbonyl group mentioned above is preferably within a range of about from 0.5 to 60% by weight, more preferably about from 1 to 40% by weight, and especially about from 3 to 30% by weight, on the basis of the total amount of the monomer components constituting the copolymer, in view of curing ability and performance of cured binder resin. The above-mentioned copolymer can be obtained by polymerizing by known processes, such as solution polymerization, emulsion polymerization, bulk polymerization and the like.

The other carbonyl group-containing resins than the above-mentioned copolymer (such as a carbonyl group-containing epoxy resin, a carbonyl group-containing alkyd resin, a carbonyl group-containing polyester resin, a carbonyl group-containing urethane resin, a carbonyl group-containing acrylic resin other than the above-mentioned copolymer) can be obtained, for example, by adding a monoadduct (which has one isocyanato group) of a compound having a hydroxyl group and a carbonyl group and having carbon atoms not more than (such as 4-hydroxy-2-butanone, 3-hydroxy-3-methyl-2-butanone and 4-hydroxy-4-methyl-2-pentanone) with a diisocyanate compound (such as tolylene diisocyanate, 4,4'-diphenylmethane diisocyanate, xylylene diisocyanate, hexamethylene diisocyanate, isophorone diisocyanate, 4,4'-methylene bis(cyclohexyl isocyanate)) to various resins containing hydroxyl groups (such as epoxy resins, alkyd resins, polyester resins, urethane resins and acrylic resins).

The compound having two or more groups selected from hydrazido group shown by the above-mentioned formula (2) and semicarbazido group shown by the above-mentioned formula (3), which can form a cured binder resin by reacting with the carbonyl group-containing compound mentioned above, is not limited as long as the compound has two or more groups in all, selected from hydrazido group shown by the formula (2) and semicarbazido group shown by the formula (3). As the examples of these, polyhydrazide compounds, polysemicarbazide compounds, and compounds having both of hydazido group and semicarbazido group can be used.

Specific examples of the polyhydrazide compound which can be uesed in the present invention include carbohydrazide (dihydrazide of carbonic acid), oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide, phthalic dihydrazide, isophthalic dihydrazide, terephthalic dihydrazide, poly(tri, tetra, penta etc.) hydrazide of carbonic acid, dihydrazide or trihydrazide of trimellitic acid; dihydrazide, trihydrazide or tetrahydrazide of pyromellitic acid; nitrilotriacetic trihydrazide, ethylenediamine tetraacetic tetrahydrazide; polyhydrazide formed by adding hydrazine to polyacrylic acid, polymethacrylic acid or copolymers containing acrylic acid or methacrylic acid as a monomer component; polyhydrazide formed by allowing a polymer having a low alkyl ester group of carboxylic acid to react with hydrazine or hydrazine hydrate.

Examples of the polysemicarbazide compound include polyhydrazides formed by adding hydrazine to resins containing isocyanato groups; compounds shown by the following formula (4).

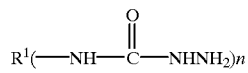

(4)

In the above formula, R represents a n-valent organic group, and n represents a integer of 1 to 4.

Specific examples of the polysemicarbazide compound shown by the formula (4) include bissemicarbazide compounds having ethylene, 1,2- or 1,3-propylene, butylene, hexylene, o-, m- or p- phenylene, tolylene or cyclohexylene as R' of the above formula (4); trisemicarbazide compounds having ethylidyne, 1-etanyl-2-ylidene, 1,1,1- or 1,2,3-propanetriyl, 1-propanyl-3-ylidene or 1-butanyl-4-ylidene as R' of the above formula (4).

As the compound having two or more groups selected from hydrazido group shown by the above-mentioned formula (2) and semicarbazido group shown by the above-mentioned formula (3), above all, carbohydrazide, oxalic dihydrazide, malonic dihydrazide, succinic dihydrazide, glutaric dihydrazide, adipic dihydrazide, maleic dihydrazide, fumaric dihydrazide, itaconic dihydrazide and so on are preferred.

The above-mentioned chemical structure shown by the chemical formula (1) mentioned above can be formed by the following reaction of a carbonyl group in the above-mentioned carbonyl group-containing compound with a hydrazido group or a semicarbazido group in the compound having two or more groups selected from hydrazido group and semicarbazido group.

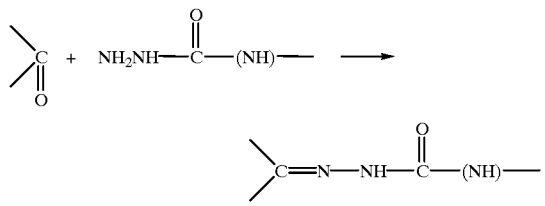

In the process of the present invention, the coating adjacent to the substrate comprises at least about 25% by weight of the cured binder resin. In addition, this coating or layer adjacent the substrate can be blended with solvents; pigments such as coloring pigments, anticorrosive pigments, extender pigments; the other resins other than the above-mentioned components for forming the cured binder resin, the other additives as required. The resins other than the above-mentioned components for forming the cured binder resin can be blended as required, in order to improve the coating performance, and can be added in the range of not more than about 300 parts by weight, preferably not more than about 100 parts by weight, based on 100 parts of the above-mentioned components for forming the cured binder resin. The thickness of the lower coating layer is not restricted, but is preferably about from 1 to 100 μm.

In the present invention, the upper coating layer formed on the lower coating layer can vary widely, depending on the performance characteristics desired for the upper layer. The form of the coating for forming the upper layer can also vary widely. For example, emulsion paints, 2-packed paints, thermosetting paints, lacquers, photo-curable coatings and solventless paints can be used. Also, the kind of the resin for the upper coating can vary widely. For example, acrylic resin coatings, alkyd resin coatings, urethane resin coatings, epoxy resin coatings and polyester resin coatings can be used. The upper coating layer can be formed and cured by a variety of well-known methods. The thickness of the upper coating layer is not restricted, but is preferably about from 5 to 100 μm.

In another embodiment of the present invention, the adhesive agent for forming the layer of the cured adhesive agent can be consist of the above-mentioned components for forming the cured binder resin, and, in addition, can be blended with solvents, pigments, resins other than the above-mentioned components for forming the cured binder resin, and other additives as required. Resins other than the above-mentioned components for forming the cured binder resin may be blended as required, in order to improve adhesive properties, and can be added in the range of not more than about 300 parts by weight, preferably not more than about 100 parts by weight, based on 100 parts of the above-mentioned components for forming the cured binder resin. The thickness of the layer of the cured adhesive agent is not restricted, but is preferably about from 1 to 100 μm.

In another embodiment of the present invention, in which a layer is adhered to a substrate by the cured adhesive agent, the adhered layer can vary widely, as long as the adhered layer can be effectivley adhered. The process of the present invention is especially effective when the adhering substance is one which can be readily permeated by the mixture of acidic compoun and water, such as cloths, papers, leathers and plastic films.

The substrates used in the present invention can vary widely, as long as the substrate coating or the adhesive agent can be effectively applied, the substrate material is not solubilised on the contact with the mixture of acid and water, and has adequate strength for the intended use. Specific examples of substrate materials which can be used include metals such as iron, aluminum, copper, brass, tin plate, stainless steel, galvanized steel, galvanealed steel, zinc-aluminum alloy plated steel, nickel-zinc alloy plated steel, aluminum plated steel; surface-treated metals in which metal surface is treated with chemical pretreatment such as phosphatizing treatment or chromate treatment; plastics, glasses, woods, slates, ceramics, mortars and the like.

In the process of the present invention, the multiple coating is removed by contacting with the mixture of acidic compound and water. The acidic compound generally acts as a catalyst for a hydrolytic reaction of the chemical structure of formula (1) mentioned above. The acidic compound (a) is not subject to any particular restriction and, for effective use herein, may be, for example, either an inorganic acid or an organic acid. The power with which the acidic compound decomposes the lower coating layer in the first process for forming and the layer of cured adhesive agent in the second process for forming, increases in proportion as the acidic compound gains in acidity. Specific examples of the acidic compound (a), include monobasic acids, polybasic acids, and inorganic acids.

Monobasic acids which can be used include aromatic monobasic acids such as benzene sulfonic acid, paratoluene sulfonic acid, dodecylbenzene sulfonic acid, benzoic acid, methylbenzoic acid and p-t-butylbenzoic acid; saturated or unsaturated fatty acids having 1 to 24 carbon atoms such as formic acid, acetic acid, propionic acid, butyric acid, caproic acid, caprylic acid, peralgonic acid, capric acid, undecanoic acid, lauric acid, myristic acid, palmitic acid, stearic acid, cyclohexane carboxylic acid, 9-decenoic acid, oleic acid, eleostearic acid, araidic acid, brassydic acid, linolic acid, and linoleic acid; hydroxyl carboxylic acids (oxy acids) such as dimethyl propionic acid, lactic acid, oxypivalic acid, 12-hydroxydodecanoic acid, 12-hydroxystearic acid, ricinolic acid, paraoxybenzoic acid, salicylic acid, and 4,4-bis(4'-hydroxyphenyl) pentanoic acid; and methyl sulfonic acid, for example. Lower alkyl esters and glycerides of these monobasic acids and such cyclic ester compounds as ε-caprolactone, γ-valerolactone and the like are also usable as monobasic acids.

Specific examples of polybasic acids which can be used in the present invention include aromatic polybasic acids such as terephthalic acid, isophthalic acid, phthalic acid, 2,6-naphthalene dicarboxylic acid, 4,4'-biphenyl dicarboxylic acid, tetrachloro phthalic acid, diphenyl methane-4,4'-dicarboxylic acid, trimellitic acid, trimesic acid and pyromellitic acid, and anhydrides thereof; saturated or unsaturated aliphatic polybasic acids such as succinic acid, glutaric acid, adipic acid, azelaic acid, sebacic acid, dodecane dicarboxylic acid, suberic acid, pimeric acid, maleic acid, fumaric acid, itaconic acid, brassylic acid and citraconic acid, and anhydrides thereof; saturated or unsaturated alicyclic polybasic acids such as hexahydrophthalic acid, hexahydroisophthalic acid, hexahydroterephthalic acid, hexahydrotrimellitic acid, methyl hexahydrophthalic acid, methyl hexahydroterephthalic acid, Δ1-tetrahydrophthalic acid, Δ2-tetrahydrophthalic acid, Δ3-tetrahydrophthalic acid, Δ4-tetrahydrophthalic acid, Δ1-tetrahydroisophthalic acid, Δ3-tetrahydroisophthalic acid, Δ4-tetrahydroisophthalic acid, Δ1-tetrahydroterephthalic acid, Δ4-tetrahydroterephthalic acid, methyl tetrahydrophthalic acid, endomethylene tetrahydrophthalic acid, methyl endomethylene tetrahydrophthalic acid and hexachloro endomethylene tetrahydrophthalic acid, and anhydrides thereof; lower alkyl (C1–6, particular dimethyl) esters of the polybasic acids mentioned above and the like.

Specific examples of inorganic acids which can be used in the present invention include hydrochloric acid, sulfuric acid, phosphoric acid, phosphorous acid, nitric acid, and esters of these acids.

The acidic compounds cited above may be used either singly or in the form of a mixture of two or more. Among these acidic compounds cited above, organic acids such as benzene sulfonic acid, paratoluene sulfonic acid, dodecylbenzene sulfonic acid, methyl sulfonic acid, formic acid, acetic acid, lactic acid, itaconic acid, maleic acid and benzoic acid, and anhydrides thereof; and inorganic acids such as hydrochloric acid, sulfuric acid, phosphoric acid, and nitric acid prove to be particularly advantageous.

The amount of the acidic compound (a) to be used is generally in the range of about from 0.01 to 99.99% by weight, preferably about from 0.1 to 95% by weight, and more preferably about from 0.5 to 70% by weight, based on the weight of the mixture (C), in view of the decomposition speed of the chemical structure shown by the above-mentioned chemical formula (1).

Water in the mixture (C) is essential to decompose the chemical structure shown by the above-mentioned chemical formula (1). The amount of water to be used in the mixture (C) is generally in the range of about from 0.01 to 99.99% by weight, preferably about from 0.5 to 60% by weight, and more preferably about from 1 to 40% by weight, based on the weight of the mixture, in view of the decomposition speed of the chemical structure shown by the above-mentioned chemical formula (1) and the dissolution of the decomposed materials in the mixture (C). Water is usually mixed with the acidic compound (a) in advance to make the mixture (C), but water which exists in a hydrophilic solvent or the adhering substance such as woods may be brought in the mixture, and a hydrophilic solvent can be added in the mixture if necessary.

In the process of the present invention, the mixture (C) can have incorporated therein an ordinary organic solvent for purposes of promoting the solution of the applied coating film or the adhesive agent into the mixture (C) or for purposes of improving the compatibility of the acidic compound (a) and water in the mixture (C). Though the amount of the organic solvent to be incorporated is not subject to any particular restriction, it is generally not more than about 99.8%, preferably not more than about 99.0%, more preferably about from 5% to 95% by weight based on the weight of the mixture (C). The ordinary organic solvents mentioned above can be used either singly or in the form of a mixture of two or more.

Any desired organic solvent can be used as the ordinary organic solvent mentioned above. Suitable organic solvents include hydrocarbon solvents such as pentane, hexane, heptane, octane, isooctane, nonane, decane, dodecane, cyclopentane, methyl cyclopentane, cyclohexane, methyl cyclohexane, pentene, hexene, octene, decene, benzene, toluene, xylene, ethyl benzene, cumene, mesitylene, butyl benzene, diethyl benzene, cyclohexene, petroleum ether, petroleum benzine, kerosene, and turpentine oil; halogenated hydrocarbon solvents such as dichloromethane, chloroform, carbon tetrachloride, ethyl chloride, dichloroethane, trichloroethane, tetrachloroethane, hexachloroethane, trichloroethylene, propyl chloride, dichloropropane, butyl chloride, chlorobenzene, dichlorobenzene, trichlorobenzene, chlorotoluene, and trichlorotrifluoroethane; alcohol solvents such as methanol, ethanol, propanol, butanol, pentanol, hexanol, heptanol, octanol, allyl alcohol, benzyl alcohol, cyclohexanol, methyl cyclohexanol, fusel oil, ethane diol, propane diol, butane diol, and glycerine; ether solvents such as dipropyl ether, dibutyl ether, dihexyl ether, ethyl vinyl ether, butyl vinyl ether, anisole, propylene oxide, epoxy butane, dioxane, tetrahydrofuran, tetrahydropyrane, dimethoxy ethane, 1,2-dibutoxyethane, acetal, diethylene glycol dimethylether, diethylene glycol diethylether, ethylene glycol monomethylether, propylene glycol monomethylether, propylene glycol monoethylether, propylene glycol monopropylether, ethylene glycol monobutylether, propylene glycol monobutylether, 3-methyl-3-methoxy propane, diethylene glycol, and triethylene glycol; ketone solvents such as acetone, methyl ethyl ketone, pentanone, hexanone, methyl isobutyl ketone, heptanone, acetonylacetone, diisobutyl ketone, isophorone, cyclohexanone, methyl cyclohexanone, and acetophenone; ester solvents such as methyl formate, ethyl formate, propyl formate, butyl formate, methyl acetate, ethyl acetate, propyl acetate, butyl acetate, pentyl acetate, 3-methoxybutyl acetate, cyclohexyl acetate, methyl propionate, benzyl acetate, ethyl butyrate, diethyl malonate, ethylene glycol monoacetate, ethylene glycol monopropionate, diethylene glycol monoacetate, diethyl carbonate, ethylene carbonate, boric esters, and phosphoric esters; nitrogen-containing solvents such as nitromethane, nitropropane, nitrobenzene, acetonitrile, diethyl amine, triethyl amine, butyl amine, aniline, N,N-dimethyl aniline, pyridine, N-methyl formamide, N,N-dimethyl formamide, acetamide, N,N-dimethyl acetamide, 2-pyrrolidone, N-methyl pyrrolidone, ε-caprolactam, morphorine; sulfur-containing solvents such as carbon disulfide, dimethyl sulfoxide, and sulforan, for example.

Among these organic solvents mentioned above, hydrocarbon solvents, ketone solvents, alcohol solvents, ether solvents, and ester solvents which are capable of thoroughly dissolving coating films or adhesive agents are advantageous. Also, organic solvents having boiling points in the range of about from 20 to 250° C. preferably about 40 to 200° C., are preferred on account of ease of use.

The method for establishing contact between the mixture (C) and the coated article or the adhering substance in the process of this invention is not critical, and can be any method which brings about contact of the mixture (C) and the cured binder resin. The contact may be attained, for example, by immersing the multiple coating film of the coated article (A) or the adhering substance (B) of an article on which the adhering substance (B) is allowed to adhere through the layer of the adhesive agent, in the mixture (C), or by exposing the multiple coating film of the coated article (A) or the adhering substance (B) to the mixture (C) in the gaseous phase. Though the contact temperature is not critical, it is generally in the range of an ambient temperature to about 200° C. One skilled in the art can determine the suitable contact time, however, contact time is preferred in the range of about from 0.5 to 40 minutes, and, more preferably, about from 5 to 20 minutes.

The process for forming a multiple coating layer of the present invention is a process for forming a lower coating layer on a substrate and a upper coating layer on the lower coating layer, the lower coating layer containing a cured binder resin having a chemical structure shown by the above-mentioned chemical formula (1). The coated article having the multiple coating layer obtained by the process for forming can be the same as the coated article of the first process for removing mentioned above.

The multiple coating layer of the coated article obtained by the process for forming the multiple coating layer of the present invention, can be removed easily by the first process for removing mentioned above, with the result that the substrate can be regenerated.

The lower coating layer in the process for forming the multiple coating layer of the present invention can be the same as the lower coating layer in the first process for removing mentioned above, and can be formed by coating and curing the lower coating usable of forming the lower coating layer in the first process for removing of the present invention. The upper coating layer in the process for forming the multiple coating layer of the present invention can be formed by coating and curing the upper coating usable of forming the upper coating layer in the first process for removing of the present invention.

The present invention is hereinafter described more specifically in the following Examples and Comparative Example, which are illustrative only and should not be construed as limiting the invention. In these Examples and Comparative Examples, parts and percentages are by weight in all cases.

Production Example 1

In a flask, 193 parts of propylene glycol monomethyl ether were placed and heated to 110° C. Then, a mixture of the following components was added dropwise to the hot ether over a period of two hours.

| | |
|---|---|
| Diacetone acrylamide | 169 parts |
| Styrene | 133 parts |
| 2-Hydroxyethyl methacrylate | 100 parts |
| n-Butyl acrylate | 210 parts |
| N,N-Dimethyl aminoethyl methacrylate | 53 parts |
| 2,2'-Azobisisobutyronitrile | 10 parts |

The reaction mixture obtained after completion of the dropwise addition was left aging for one hour. Then, 3 parts of polymerization initiator (produced by Nippon Oils & Fats Co., Ltd. and marketed under trademark designation of "Perbutyl O") was added to the aged reaction mixture in five split portions over a period of one hour. The resultant mixture was further left aging at 110° C. for two hours and then cooled. Then, into the cooled mixture, 44 parts of propylene glycol monomethyl ether were added and stirred to produce a resinous solution having a solid content of 74%.

EXAMPLE 1

Into 230 parts of the resinous solution having a solid content of 74% produced by the above Production Example 1, 2.6 parts of acetic acid having a concentration of 100% were added to neutralize the mixture, and then 200 parts of deionized water were added into the neutralized mixture. The obtained resultant mixture was further mixed with 91 parts of a titanium white-paste having a solid content of 56% and 520 parts of deionized water to obtain a cationic electrodeposition coating (P-1).

This electrodeposition coating was coated on a steel plate surface-treated with a zinc phosphate treatment by a cationic electrodeposition coating method using an applied voltage of 100 Volt and the applied time of 3 minutes, and dried at 60° C. for 30 minutes to obtain an electrodeposited steel plate having a coating film-thickness of 15 μm. The electrodeposited coating film on the steel plate was then cured by dipping the electrodeposited steel plate in an aqueous crosslinker-solution (carbohydrazide/deionized water/phosphoric acid/ethylene glycol monobutyl ether/propylene glycol monomethyl ether=10/62/3/14/11 (weight ratio)) at 20° C. for 20 minutes. Then, onto the cured film of the electrodeposited steel plate, "VINY-DELUXE" (trademark, produced by Kansai Paint Co., Ltd., a non-crosslinkable emulsion paint) was coated by using a bar coater No. 48 to form a dry coating film thickness of 30 μm and laid at room temperature for one day to obtain a coated test piece. The coated test piece was immersed into the mixture (C) having the formulation and the conditions shown by Table 1.

Comparative Example I

Onto the steel plate surface-treated with a zinc phosphate, "VINY-DELUXE" was coated directly by using a bar coater No. 48 and laid at room temperature for one day to obtain a coated test piece. The coated test piece was immersed into the mixture (C) having the formulation and the condition shown by Table 1.

Production Example 2

In a flask, 50 parts of propylene glycol monomethyl ether were placed and heated to 110° C. A mixture of the following components was then added dropwise to the hot ether over a period of two hours.

| | |
|---|---|
| Acrylic acid | 8 parts |
| Diacetone acrylamide | 135 parts |
| Styrene | 102 parts |
| Stearyl methacrylate | 135 parts |
| n-Butyl acrylate | 70 parts |
| 2,2'-Azobisisobutyronitrile | 7 parts |
| Propylene glycol monomethyl ether | 40 parts |

The reaction mixture obtained after completion of the dropwise addition was left aging for one hour. Then 2 parts of polymerization initiator (produced by Nippon Oils & Fats Co., Ltd. and marketed under trademark designation of "Perbutyl O") was added to the aged reaction mixture in five split portions over a period of one hour. The resultant mixture was further left aging at 110° C. for two hours and then cooled. Into the cooled mixture, 225 parts of isopropanol were added, and 12 parts of triethyl amine were added to neutralize the mixture. 500 parts of deionized water were then added into the neutralized mixture with stirring to emulsify the mixture. Then, isopropanol in the emulsified mixture was removed by evaporation under a reduced pressure to obtain an emulsion having a resin solid content of 48.4%, a pH value of 9.44 and a particle diameter of 0.43 $\mu$m.

Into the emulsion obtained above, an aqueous solution of carbohydrazide having a concentration of 20% was added at the ratio of 0.5 equivalent of hydrazido group based on one equivalent of carbonyl group in the emulsion to obtain a coating (P-2).

EXAMPLE 2

The coating (P-2) obtained by the Production Example 2 was coated on a board of a Japanese cedar having a water content of 15% as a substrate, just after producing the coating (P-2), by using a bar coater No. 48, and dried at 60° C., for 30 minutes to form a lower coating layer having a dry film-weight ratio of about 20 g/m2. Then, on the lower coating layer, "Aqua Gloss" (trademark, produced by Kansai Paint Co., Ltd., a crosslinkable emulsion paint) was coated by using a bar coater No. 48, and dried at 60° C. for 30 minutes and further laid at room temperature for one week to form a upper coating layer having a film thickness of about 30 $\mu$M. The coated substrate obtained above as a test piece, was immersed into the mixture (C) having the formulation and under the conditions shown in Table 1.

EXAMPLES 3 to 7 AND COMPARATIVE EXAMPLES 2 to 7

Example 2 was repeated except that the kind of substrate, the kind of lower coating, the kind of upper coating, the formulation of the mixture (C), the immersion time and the immersion temperature were changed as shown in Table 1.

The removal state of each of the coating films of the test piece after the immersion in Examples 1 to 7 and Comparative Examples 1 to 7 was evaluated. The test results are shown in Table 1.

In Table 1, (*1) to (*3) refer to the following:

(*1) Kinds of substrates (1): A Japanese cedar having a water content of 15%

(2): A steel plate surface-treated with a zinc phosphate treatment (3): A plate made of an acrylic resin (a product of Mitsubishi Rayon Co.,Ltd.)

(*2) Kinds of upper coatings (1): "Aqua Gloss" (trademark, produced by Kansai Paint Co.,Ltd., a crosslinkable emulsion paint)

(2): "VINY-DELUXE" (trademark, produced by Kansai Paint Co., Ltd., a non-crosslinkable emulsion paint )

(3): "Retan PG80 Clear" (trademark, produced by Kansai Paint Co., Ltd., a two-packed urethane coating, clear coating)

(4): "Retan PG80 White" (trademark, produced by Kansai Paint Co., Ltd., a two-packed urethane coating, white color)

(*3) Test result after immersion a: Whole coatings were come apart and removed.

b: Coatings were blistered, but not removed.

c: Coatings more than half of coated area were not removed.

d: Coating surface became rough, but coatings were not removed.

e: Coatings less than half of coated area were not removed.

TABLE 1

| | | | Examples | | | | | | | Comparative Examples | | | | | | |
|---|---|---|---|---|---|---|---|---|---|---|---|---|---|---|---|---|
| | | | 1 | 2 | 3 | 4 | 5 | 6 | 7 | 1 | 2 | 3 | 4 | 5 | 6 | 7 |
| Kind of substrate (*1) | | | (2) | (1) | (1) | (2) | (2) | (3) | (3) | (2) | (1) | (1) | (2) | (2) | (3) | (3) |
| Kind of lower coating | | | P-1 | P-2 | P-2 | P-2 | P-2 | P-2 | P-2 | none | none | none | none | none | none | none |
| Kind of upper coating (*2) | | | (2) | (1) | (2) | (1) | (2) | (3) | (4) | (2) | (1) | (2) | (1) | (2) | (3) | (4) |
| Composition of mixture (C) (parts by weight) | Acidic compound (a) | 100% Formic acid | | 20 | 20 | 20 | 20 | 20 | 20 | | 20 | 20 | 20 | 20 | 20 | 20 |
| | | 100% Acetic acid | 83 | | | | | | | 83 | | | | | | |
| | Water | Tap water | 17 | 10 | 10 | 10 | 10 | 10 | 10 | 17 | 10 | 10 | 10 | 10 | 10 | 10 |
| | Organic solvent | Cyclohexanone | | 70 | 70 | 70 | 70 | 70 | 70 | | 70 | 70 | 70 | 70 | 70 | 70 |
| Immersion time (minutes) | | | 5 | 6 | 5 | 4 | 4 | 5 | 10 | 30 | 30 | 30 | 30 | 30 | 10 | 10 |
| Immersion temperature (° C.) | | | 60 | 60 | 60 | 60 | 60 | 60 | 60 | 60 | 60 | 60 | 60 | 60 | 60 | 60 |
| Test result after immersion (*3) | | | a | a | a | a | a | a | a | b | c | d | e | c | c | c |

Production Example 3

In a flask, 90 parts of propylene glycol monomethyl ether were placed and heated to 110° C. Then, a mixture of the following components was added dropwise to the hot ether over a period of two hours.

| | |
|---|---|
| Acrylic acid | 40 parts |
| Diacetone acrylamide | 135 parts |
| 2-Ethylhexyl acrylate | 275 parts |
| 2,2'-Azobisisobutyronitrile | 22.5 parts |
| Propylene glycol monomethyl ether | 90 parts |

The reaction mixture obtained after completion of the dropwise addition was left aging for one hour. 2 parts of polymerization initiator (produced by Nippon Oils & Fats Co., Ltd. and marketed under trademark designation of "Perbutyl O") was then added to the aged reaction mixture in five split portions over a period of one hour. The resultant mixture was further left aging at 110° C., for two hours and then cooled. Then, into the cooled mixture, 45 parts of triethyl amine were added, and then added 200 parts of deionized water with stirring to produce an aqueous solution of an acrylic resin having a solid content of 53.4

EXAMPLE 8

Into parts of the aqueous solution of an acrylic resin produced by the above Production Example 3, an aqueous solution obtained by dissolving 0.43 part of carbohydrazide in 4 parts of deionized water was added and stirred sufficiently to get an adhesive agent (A-1). The adhesive agent (A-1) was coated on a slate plate, just after producing the adhesive agent (A-1), and a felt was pressed against the non-cured layer of the adhesive agent (A-1) on the slate plate, and then, laid at room temperature for one week in order to cure the layer of the adhesive agent (A-1) and to adhere the felt to the slate plate through the layer of the cured adhesive agent (A-1). The obtained slate plate having the felt which was allowed to adhere through the layer of the cured adhesive agent (A-1) to the surface of the slate plate, was made a test piece. The test piece was immersed into the mixture (C) having the formulation and on the conditions shown in Table 2.

Comparative Example 8

Example 8 was repeated except that the test piece was immersed into a solvent consisting of cyclohexanone only.

Comparative Example 9

Example 8 was repeated except that a marketed adhesive agent for woodworking (produced by Konishi Co.,Ltd.) was used instead of the adhesive agent (A-1)

Comparative Example 10

Example 8 was repeated except that Standard Arardite (product of Nagase Chiba Co.,Ltd., an adhesive agent containing epoxide) was used in stead of the adhesive agent (A-1).

Each removal state of the felt and the layer of the adhesive agent after the immersion in Example 8 and Comparative Examples 8 to 10 was evaluated. And water resistance of each test piece obtained in Example 8 and Comparative Examples 8 to 10 was evaluated. The test results are shown in Table 2.

EXAMPLE 9 AND COMPARATIVE EXAMPLES 11 TO 12

Example 8 and Comparative Examples 9 and 10 were repeated except that a Japanese cedar having a water content of 15% was used in stead of a slate plate as a substrate, and each example was conducted as shown in Table 3.

The each removal state of the felt and the layer of the adhesive agent after the immersion in Example 9 and Comparative Examples 11 to 12 was evaluated. And water resistance of each test piece obtained in Example 9 and Comparative Examples 11 to 12 is evaluated. The test results are shown in Table 3.

EXAMPLE 10 AND COMPARATIVE EXAMPLES 13 TO 14

Example 8 and Comparative Examples 9 and 10 were each repeated except that a steel plate surface-treated with a zinc phosphate treatment was used instead of a slate plate as a substrate, and each example was conducted as shown in Table 4.

Comparative Example 15

Comparative Example 14 was repeated, except that the test piece was immersed into a solvent consisting of cyclohexanone only.

Each removal state of the felt and the layer of the adhesive agent after the immersion in Example 10 and Comparative Examples 13 to 15 was evaluated. And water resistance of each test piece obtained in Example 10 and Comparative Examples 13 to 15 was evaluated. The test results are shown in Table 4.

EXAMPLES 11 TO 12 AND COMPARATIVE EXAMPLES 16 TO 18

Example 9 and Comparative Examples 11 and 12 were repeated, except that each Example was conducted, using the formulation of mixture (C), and under the immersion conditions, as shown in Table 5.

The each removal state of the felt and the layer of the adhesive agent after the immersion in each example was evaluated. And water resistance of each test piece obtained in each example was evaluated. The test results are shown in Table 5.

EXAMPLES 13 TO 14

Examples 11 and 12 were repeated, except that each felt was taken off forcibly from the test piece before immersion, and each example was conducted on the condition shown in Table 6. On each surface of the test piece taken off the felt before immersion, the fibers of felt stuck.

EXAMPLE 15 AND COMPARATIVE EXAMPLE 19

Examples 13 and 14 were repeated, except that a steel plate surface-treated with a zinc phosphate treatment was used instead of a Japanese cedar having a water content of 15% was used as a substrate, and each example was conducted on the condition shown in Table 6.

The removal state of each of the felt and the layer of the adhesive agent after the immersion in each example was evaluated. Water resistance of each test piece taken off the felt obtained in each example was also evaluated. The test results are shown in Table 6.

In Tables 2 to 6, (*4) to (*7) refer to the following:

(*4) Kinds of substrates:

(1): A Japanese ceder having a water content of 15%

(2): A steel plate surface-treated with a zinc phosphate treatment (3): A slate plate
(*5) Kinds of adhesive agents
(A-1): The adhesive agent obtained in Example 8
(A-2): a marketed adhesive agent for woodworking (produced by Konishi Co.,Ltd.)
(A-3): Standard Araldite (product of Nagase Ciba Co., Ltd., an adhesive agent containing epoxide)
(*6) Water Resistance: A surface-state of a test piece after immersion of tap water at room temperature for hours was evaluated.
   a: Changes were not recognized, and a surface-state was good.
   b: Whitening of a layer of an adhesive agent, or peeling of a substance adhering to a substrate was recognized.
(*7) State of surface after removal: A test piece was immersed into the mixture (C) in the specified condition of the formulation, the immersion temperature and the immersion time. The surface-state after removal by immersion was evaluated.
   a: A substance adhering to a substrate was not removed at the immersion time of 120 minutes, and when the felt of the test piece was taken off forcibly on the immersion time of 120 minutes, the remain of the felt and the layer of the adhesive agent was recognized.

TABLE 2

| | | | Example | Comparative Example | | |
|---|---|---|---|---|---|---|
| | | | 8 | 8 | 9 | 10 |
| Kind of substrate (*4) | | | (3) | (3) | (3) | (3) |
| Kind of adhesive agent (*5) | | | A-1 | A-1 | A-2 | A-3 |
| Composition of mixture (C) (parts by weight) | Acidic compound (a) | 100% Acetic acid | | | | |
| | | 100% Formic acid | 20 | | 20 | 20 |
| | Water | Tap water | 10 | | 10 | 10 |
| | Organic solvent | Cyclohexanone Butyl acetate | 70 | 100 | 70 | 70 |
| Water resistance (surface-state after immersion in tap water for 5 hours (*6) | | | a | a | b | a |
| Immersion temperature (° C.) | | | Room temperature | Room temperature | Room temperature | Room temperature |
| Immersion time untill removal of adhering substance (minutes) | | | 10 | 60 | a | Felt was not removed at immersion time of 120 minutes |
| State of surface after removal (*7) | | | good | Remain of adhesive agent was recognized | | |

TABLE 3

| | | | Example | Comparative Example | |
|---|---|---|---|---|---|
| | | | 9 | 11 | 12 |
| Kind of substrate (*4) | | | (1) | (1) | (1) |
| Kind of adhesive agent (*5) | | | A-1 | A-2 | A-3 |
| Composition of mixture (C) (parts by weight) | Acidic compound (a) | 100% Acetic acid | | | |
| | | 100% Formic acid | 20 | 20 | 20 |
| | Water | Tap water | 10 | 10 | 10 |
| | Organic solvent | Cyclohexanone Butyl acetate | 70 | 70 | 70 |
| Water resistance (surface-state after immersion in tap water for 5 hours (*6) | | | a | b | a |
| Immersion temperature (° C.) | | | Room temperature | Room temperature | Room temperature |
| Immersion time untill removal of adhering substance (minutes) | | | 20 | a | Felt was not removed at immersion time of 120 minutes |
| State of surface after removal (*7) | | | good | | |

TABLE 4

|  |  |  | Example | Comparative Example | | |
|---|---|---|---|---|---|---|
|  |  |  | 10 | 13 | 14 | 15 |
| Kind of substrate (*4) | | | (2) | (2) | (2) | (2) |
| Kind of adhesive agent (*5) | | | A-1 | A-2 | A-3 | A-3 |
| Composition of mixture (C) (parts by weight) | Acidic compound (a) | 100% Acetic acid | | | | |
| | | 100% Formic acid | 20 | 20 | 20 | |
| | Water | Tap water | 10 | 10 | 10 | |
| | Organic solvent | Cyclohexanone | 70 | 70 | 70 | |
| | | Butyl acetate | | | | 100 |
| Water resistance (surface-state after immersion in tap water for 5 hours (*6) | | | a | b Rust occurred | a | a |
| Immersion temperature ( ) | | | Room temperature | Room temperature | Room temperature | Room temperature |
| Immersion time untill removal of adhering substance (minutes) | | | 20 | 70 | Felt was not removed | Felt was not removed |
| State of surface after removal (*7) | | | good | Remain of adhesive agent was recognized | at immersion time of 120 minutes | at immersion time of 120 minutes |

TABLE 5

|  |  |  | Example | | Comparative Example | | |
|---|---|---|---|---|---|---|---|
|  |  |  | 11 | 12 | 16 | 17 | 18 |
| Kind of substrate (*4) | | | (1) | (1) | (1) | (1) | (1) |
| Kind of adhesive agent (*5) | | | A-1 | A-1 | A-2 | A-3 | A-3 |
| Composition of mixture (C) (parts by weight) | Acidic compound (a) | 100% Acetic acid | 45 | 50 | | 50 | |
| | | 100% Formic acid | | | | | |
| | Water | Tap water | 10 | | | | |
| | Organic solvent | Cyclohexanone | | | | | |
| | | Butyl acetate | 45 | 50 | 100 | 50 | 100 |
| Water resistance (surface-state after immersion in tap water for 5 hours (*5) | | | a | a | b | a | a |
| Immersion temperature (° C.) | | | 60 | 50 | 60 | 60 | 50 |
| Immersion time untill removal of adhering substance (minutes) | | | 20 | 20 | Felt was not removed | Felt was not removed | Felt was not removed |
| State of surface after removal (*7) | | | good | good | at immersion time of 20 minutes | at immersion time of 20 minutes | at immersion time of 20 minutes |

TABLE 6

|  |  |  | Example | | | Comparative Example |
|---|---|---|---|---|---|---|
|  |  |  | 13 | 14 | 15 | 19 |
| Kind of substrate (*4) | | | (1) | (1) | (2) | (2) |
| Kind of adhesive agent (*5) | | | A-1 | A-1 | A-1 | A-1 |
| Composition of mixture (C) (parts by weight) | Acidic compound (a) | 100% Acetic acid | 45 | 50 | 45 | 50 |
| | | 100% Formic acid | | | | |
| | Water | Tap water | 10 | | 10 | |
| | Organic solvent | Cyclohexanone | | | | |
| | | Butyl acetate | 45 | 50 | 45 | 50 |
| Water resistance (surface-state after immersion in tap water for 5 hours (*6) | | | a | a | a | a |
| Immersion temperature (° C.) | | | 60 | 60 | 60 | 60 |
| Immersion time untill removal of adhering substance (minutes) | | | 5 | 10 | 3 | Remain of fiber and |
| State of surface after removal (*7) | | | good | good | good | adhesive agent was |

TABLE 6-continued

| | Example | | | Comparative Example |
|---|---|---|---|---|
| | 13 | 14 | 15 | 19 |
| | | | | recognized at immersion time of 30 minutes |

I claim:

1. A process for removing multiple layers from a substrate, wherein the multiple layers comprise at least one cured binder layer adjacent to the substrate, the binder comprising at least about 25% by weight of a cured binder resin that includes the structure shown by the following chemical formula (1)

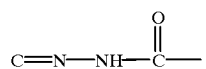
(1)

the cured binder resin being formed by a curing reaction of a carbonyl group-containing compound with a compound having two or more groups in all, selected from the hydrazido group of formula (2), the hydrazido group bonding to a carbon atom directly, and the semicarbazido group of formula (3)

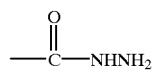
(2)

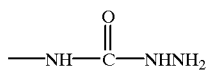
(3)

the coating further comprising at least one upper layer bonded to the binder layer, the process comprising contacting the multiple layers with a mixture comprising at least one acidic compound and at least about 0.01% water to dissolve the binder.

2. A process according to claim 1, wherein the carbonyl group-containing compound is a carbonyl group-containing acrylic resin.

3. A process according to claim 1, wherein the compound having two or more of hydrazide group or semi-carbazide group in a molecule is at least one compound selected from the group consisting of carbohydrazide, oxalic dihydrazide, malonic dihydrazide, succinic dihydrazide, glutaric dihydrazide, adipic dihydrazide, maleic dihydrazide, fumaric dihydrazide and itacoic dihydrazide.

4. A process according to claim 1, wherein the acidic compound is organic acid or inorganic acid.

5. A process according to claim 1, wherein the amount of the acidic compound (a) in the mixture (C) is 0.01 to 99.99% by weight.

6. A process according to claim 1, wherein the amount of water in the mixture (C) is 0.01 to 99.99% by weight.

7. A process according to claim 1, wherein the mixture (C) further contains an organic solvent.

8. A process according to claim 1, wherein the mixture (C) is contacted to the coated article (A) or the adhering substance (B) by way of liquid phase-contact method or gas phase-contact method.

9. A process according to claim 1, wherein the mixture (C) is contacted to the coated article (A) or the adhering substance (B) at an ambient temperature to 200° C.

10. A process according to claim 1, wherein the layer of the cured adhesive agent is allowed to adhere with a state of being crosslinked.

11. A process according to claim 1, wherein the adhering substance (B) can be permeated with the mixture (C).

12. A process according to claim 1 wherein the binder consists essentially of resin having a chemical structure shown by formula (1).

13. A process according to claim 1 wherein at least one upper coating layer is preformed.

14. A process according to claim 13 wherein at least one upper coating layer is slected from the group consisting of cloth, paper, leather and preformed plastic films.

15. A process for removing multiple layers from a substrate, wherein the multiple layers comprise at least one cured binder layer adjacent the substrate, the binder comprising at least about 25% by weight of a cured binder resin having a chemical structure shown by the following chemical formula (1)

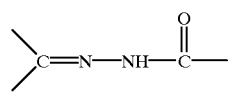
(1)

the coating further comprising at least one upper layer bonded to the binder layer, the process comprising contacting the multiple layers with a mixture comprising at least one acidic compound and at least about 0.01% water for a period sufficient to solublize the cured binder resin.

* * * * *